(12) United States Patent  (10) Patent No.: US 9,007,534 B2
Nomura et al.  (45) Date of Patent: Apr. 14, 2015

(54) PORTABLE TERMINAL DEVICE

(71) Applicant: Lenovo (Beijing) Co., Ltd., Haidian District, Beijing (CN)

(72) Inventors: Ryohta Nomura, Beijing (CN); Ke Shang, Beijing (CN); Fang Xu, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/220,521

(22) Filed: Mar. 20, 2014

(65) Prior Publication Data

US 2014/0293131 A1  Oct. 2, 2014

(30) Foreign Application Priority Data

Mar. 28, 2013  (CN) .......................... 2013 1 0105293

(51) Int. Cl.
*H04N 9/31*  (2006.01)
*H04N 5/91*  (2006.01)
*G03B 21/10*  (2006.01)

(52) U.S. Cl.
CPC ............. *G03B 21/10* (2013.01); *Y10S 345/905* (2013.01)

(58) Field of Classification Search
USPC ......... 348/744, 794, 838, 839, 825, 739, 571; 361/679.26, 679.27, 679.06, 679.09; 345/901, 905; 353/79, 31
See application file for complete search history.

(56) References Cited

U.S. PATENT DOCUMENTS

2012/0224314 A1* 9/2012 Hinshaw et al. ......... 361/679.09

* cited by examiner

*Primary Examiner* — Jefferey Harold
*Assistant Examiner* — Jean W Desir
(74) *Attorney, Agent, or Firm* — Brinks Gilson & Lione; G. Peter Nichols

(57) ABSTRACT

A portable terminal device includes a display screen; a pico projector for receiving an image signal of a predetermined format and projecting image light onto the display screen according to the image signal of the predetermined format, so that an image corresponding to the image signal of the predetermined format is displayed on the display screen; and a main body part, for fixing the display screen and the pico projector. The main body part includes a first part and a second part that are hinged by a hinge part. The display screen is fixed on the first part and the pico projector is positioned at the edge of the first part and is fixed on the first part, the second part or the hinge part. The pico projector forms a predetermined angle between the pico projector and the display screen while projecting.

10 Claims, 2 Drawing Sheets

PORTABLE TERMINAL DEVICE

BACKGROUND

This application claims priority to Chinese patent application No. 201310105293.5 filed on Mar. 28, 2013, the entire contents of which are incorporated herein by reference.

The present invention relates to a field of display technology, and more particularly to a portable terminal device.

Currently, in various terminal devices with displays (such as notebook, TV set or the like), the display part contributes to the majority of the total weight of the terminal device. Especially for those large terminal devices with displays (such as TV set or the like), the display part even contributes to almost the total weight of the TV set.

In the field of display technology, in order to reduce the total weight of these terminal devices, massive attention has been given on how to reduce the weight of the display in the terminal device, and various attempts have been conducted. For example, by way of replacing a glass substrate with a plastic substrate, by way of reducing the thickness and the weight of the glass in the display, by way of reducing the thickness and weight of the backlight section, by way of reducing the weight of the display in the terminal device, the total weight of the terminal device can be reduced. These technologies can make the display lighter and thinner, and improve the prior art to some extent. However, none of these technologies realize an ultra thin flat panel display.

Thus, a technology of realizing the ultra thin flat panel display is needed.

SUMMARY

In order to resolve the above-described technical issue, the invention provides a portable terminal device, which has a display screen made of ultra-thin flat material and projects image light on a display by a pico projector to display, so as to realize a ultra-thin flat panel display.

According to the invention, a portable terminal device is provided, including: a display screen; a pico projector, for receiving image signal of a predetermined format and projecting image light onto the display screen according to the image signal of the predetermined format, so that an image corresponding to the image signal of the predetermined format is displayed on the display screen; a main body part, for fixing the display screen and the pico projector, the main body part includes a first part, a second part and a hinge part, the display screen is fixed on the first part, the pico projector is fixed on the first part, the second part or the hinge part; wherein the pico projector is positioned at the edge of the display screen, wherein the first part and the second part is hinged by the hinge part, so that the first part is rotatable with respect to the second part, in order to form a predetermined angle between the pico projector and the display screen while projecting.

Preferably, in the portable terminal device, the main body part includes: a processor, for generating the image signal of the predetermined format, and transmitting the image signal of the predetermined format to the pico projector; a memory, for storing various data that the portable terminal device needs; and an input part, for receiving an input operation of a user. The processor, the memory and the input part are positioned in the second part.

Preferably, in the portable terminal device, the image signal of the predetermined format is generated and transmitted by another device.

Preferably, in the portable terminal device, the pico projector is movably fixed to the edge of the first part, so that the pico projector is able to move along the edge of the first part; the pico projector is movably fixed to the edge where the second part and the first part hinged, so that the pico projector is able to move along the edge where the second part and the first part hinged; or the pico projector is movably fixed to the hinge part, so that the pico projector is able to move along the hinge part.

Preferably, in the portable terminal device, the image light projected by the pico projector is ultraviolet light or blue light near ultraviolet; on the display screen, a first fluorescent material for generating a first primary color light visible to human eyes, a second fluorescent material for generating a second primary color light visible to human eyes, and a third fluorescent material for generating a third primary color light visible to human eyes are coated; and the first fluorescent material is hit by the ultraviolet light or the blue light near ultraviolet projected from the pico projector to generate the first primary color light, the second fluorescent material is hit by the ultraviolet light or the blue light near ultraviolet projected from the pico projector to generate the second primary color light, and the third fluorescent material is hit by the ultraviolet light or the blue light near ultraviolet projected from the pico projector to generate the third primary color light, and the first primary color light, the second primary color light and the third primary color light are used to synthesize the image corresponding to the image signal of the predetermined format.

Preferably, in the portable terminal device, the image light projected by the pico projector has a peak value of intensity at a first wavelength and the intensities at other wavelengths are approximately zero, the first wavelength belongs to a waveband of ultraviolet light or blue light near ultraviolet. Corresponding to the pixel arrangement of the pico projector, the display screen is divided into pixel areas and each pixel area is further divided into three sub pixel areas. The first fluorescent material is coated on a first sub pixel area of each pixel area, the second fluorescent material is coated on a second sub pixel area of each pixel area, the third fluorescent material is coated on a third sub pixel area of each pixel area, wherein, when the light of the first wavelength hits the first fluorescent material, the first fluorescent material generates the first primary color light; when the light of the second wavelength hits the second fluorescent material, the second fluorescent material generates the second primary color light; and when the light of the third wavelength hits the third fluorescent material, the third fluorescent material generates the third primary color light.

Preferably, in the portable terminal device, the image light projected by the pico projector has peak values of intensity at a first wavelength, a second wavelength and a third wavelength, and the intensities at other wavelengths are approximately zero, the first wavelength, the second wavelength and the third wavelength belong to a waveband of ultraviolet light or blue light near ultraviolet. The first fluorescent material, the second fluorescent material and the third fluorescent material are coated evenly on the display screen, wherein, when the light of the first wavelength hits the first fluorescent material, the first fluorescent material generates the first primary color light, and the first fluorescent material is transparent for light of the second wavelength and the third wavelength; when the light of the second wavelength hits the second fluorescent material, the second fluorescent material generates the second primary color light, and the second fluorescent material is transparent for light of the first wavelength and the third wavelength; and when the light of the third wavelength hits the third fluorescent material, the third fluorescent material generates the third primary color light, and the third fluorescent material is transparent for light of the first wavelength and the second wavelength.

Preferably, in the portable terminal device, the light of the first wavelength projected by the pico projector corresponds to the first primary color light in the image corresponding to the image signal of the predetermined format, the light of the second wavelength projected by the pico projector corresponds to the second primary color light in the image corresponding to the image signal of the predetermined format, the light of the third wavelength projected by the pico projector corresponds to the third primary color light in the image corresponding to the image signal of the predetermined format.

Preferably, in the portable terminal device, the pico projector is a pico projector or a laser scanning pico projector based on digital light processing.

Preferably, in the portable terminal device, the pico projector is positioned at a first side of the display screen, and projects the image light from the first side of the display screen to the display screen; a absorb film is arranged at a second side of the display screen, for absorbing the ultraviolet light or the blue light near ultraviolet that has not been absorbed by the first fluorescent material, the second fluorescent material and the third fluorescent material, wherein the user views the image from the second side of the display screen.

Preferably, in the portable terminal device, the display screen is made of resin material, plastic material or fabric material.

By adopting the portable terminal device of the invention, by fixing the positions of the projector and the display screen, and by adopting a technology of hitting the fluorescent material on the display screen by the ultraviolet light, it is possible to implement a display screen made of ultra-thin flat material, to realize the display of black display screen and transparent display screen and to realize an excellent display in both dark environment and bright environment.

Other features and advantages of the invention will be later described in the following specification, and some of them will become obvious from the specification or become better understood by implementing the invention. The purpose and other advantages of the invention may be implemented and obtained by structures in the specification, claims and drawings.

BRIEF DESCRIPTION OF THE DRAWINGS

The accompanying drawings are provided for a further understanding of the invention, and constitute one part of the specification. Both the accompanying drawings and the embodiments of the invention are used to explain the invention, rather than restrain the invention. In the accompanying drawings.

DETAILED DESCRIPTION

Figure 1:
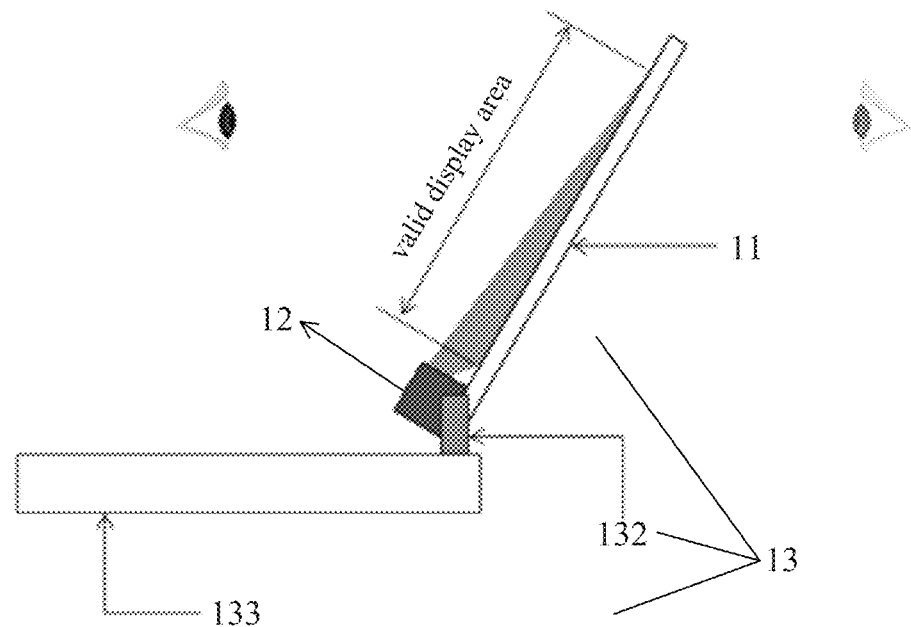
FIG. 1 shows an illustrative diagram of a portable terminal device according to embodiments of the invention.
Figure 2:
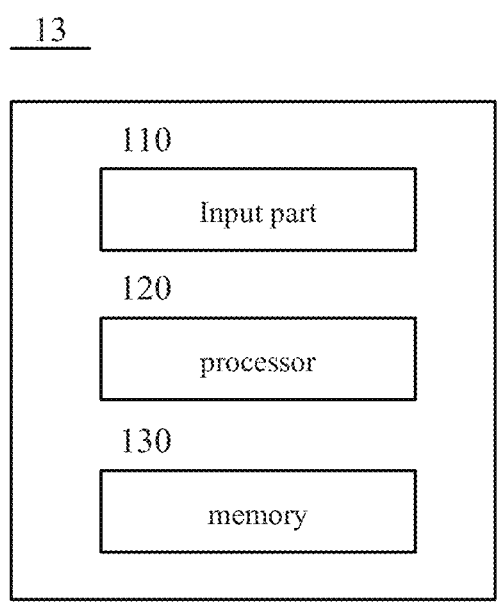
FIG. 2 shows an illustrative block diagram of a second part of a main body part of the portable terminal device according to the embodiments of the invention.

Various embodiments of the invention will be described in detail with reference to the accompanying drawings. Herein, it should be noted, in the drawings, like reference numerals will be assigned to components with essentially the same or similar structures and functions, and the descriptions thereof will be omitted.

As shown in FIG. 1, an illustrative diagram of a portable terminal device 1 according to embodiments of the invention is shown. The portable terminal device 1 according to embodiments of the invention includes: a display screen 11, a pico projector 12 and a main body part 13.

The pico projector 12 is used for receiving image signal of a predetermined format and projecting image light onto the display screen 11 according to the image signal of the predetermined format, so that an image corresponding to the image signal of the predetermined format is displayed on the display screen 11.

The display screen 11 may be made of resin material, plastic material or fabric material. However, the invention is not limited thereto. The display screen 11 may be made of other thin material.

The main body part 13 is used for fixing the display screen 11 and the pico projector 12, and the main body part 13 includes a first part 131 (not shown), a second part 132 and a hinge part 133. The first part 131 and the second part 132 are hinged by the hinge part 133, so that the first part 131 is rotatable with respect to the second part 132.

The display screen 11 is fixed on the first part 131. For example, the first part 131 may be a frame fixing at least a first edge of the display screen 11, and the first edge of the display screen 11 is connected to the second part 132 by the first part 131 and the hinge part 133. Alternatively, the first part 131 can be just a rivet for fixing the display screen 11, and the like. It should be understood, the invention is not limited thereto. As long as an element for connecting the display screen 11 to the second part 132 or the hinge part 133 exists, the element can be used as the first part 131.

In the case that the first part 131 can be the frame fixing at least the first edge of the display screen 11, the pico projector can be fixed on the edge of the display screen, or may be fixed on the first part, the second part or the hinge part while being positioned on the edge of the display screen, in order to form a predetermined angle between the pico projector and the display screen while projecting.

Alternatively, in the case that the first part 131 is other fixing element (for example, the rivet and the like) rather than the frame fixing at least the first edge of the display screen 11, the pico projector can be fixed on the edge of the display screen, or can be fixed on the first part, the second part or the hinge part while being positioned on the edge of the display screen, in order to form the predetermined angle between the pico projector and the display screen while projecting.

Preferably, the pico projector is movably fixed to the edge of the display screen, so that the pico projector can move along the edge of the display screen; the pico projector is movably fixed to the edge of the first part, so that the pico projector can move along the edge of the first part; or the pico projector is movably fixed to the edge where the second part and the first part hinged, so that the pico projector can move along the edge where the second part and the first part hinged; or the pico projector is movably fixed to the hinge part, so that the pico projector can move along the hinge part.

Preferably, a concave part for housing the pico projector is set on the second part.

In the portable terminal device 1 according to the embodiments of the invention, the image signal of the predetermined format can be generated by another device and transmitted to the portable terminal device 1. In this case, the portable terminal device 1 simply functions as an extended display device, and the main body part 13 can simply function as a case part.

On the other hand, in the portable terminal device 1 according to the embodiments of the invention, the image signal of the predetermined format can be generated by the portable terminal device 1 according to the embodiments of the invention itself. In this case, the main body part 13 can include: an input part 110, a processor 120 and a memory 130. The processor 120 is used for generating the image signal of the predetermined format and transmitting the image signal of the predetermined format to the pico projector 12. The memory 130 is used for storing various data that the portable terminal device 1 needs. The memory 130 can include flash memory, hard drive and the like. The input part 110 is used for receiving an input operation of a user.

For example, the portable terminal device 1 is implemented as a laptop. In this case, the input part 110 receives the input operation of the user; the processor 120 performs processing based on the input operation received by the input part 110, generates the image signal of the predetermined format, and transmits the image signal of the predetermined format to the pico projector 12; the pico projector 12 receives the image signal of the predetermined format, and projects the image light corresponding to the image signal of the predetermined format onto the display screen 11. In this case, the area of the first part may be slightly greater than, slightly smaller than or equal to the area of the second part.

In this case, preferably, the processor, the memory and the input part are positioned in the second part. Alternatively, the input part is positioned in the second part, the processor and the memory can be positioned in the first part or the second part, respectively.

As another example, the portable terminal device 1 can be implemented as a portable display device (for example, a TV display). In this case, the input part 110 receives the image signal from eternal sources, such as the image signal of a DVD device, a HDMI output device, a Set-Top Box, a PC, a smart phone and the like; the memory 130 stores the image signal received by the input part 110; the processor 120 converts the image signal received by the input part 110 into the image signal of the predetermined format and transmits the image signal of the predetermined format to the pico projector 12; the pico projector 12 receives the image signal of the predetermined format, and projects the image light according to the image signal of the predetermined format onto the display screen 11, so that the image corresponding to the image signal of the predetermined format is displayed on the display screen 11.

In this case, preferably, the first part 131 is the frame of the display screen 11 of the portable terminal device 1, meanwhile the processor, the memory and the input part may be positioned in the first part or the second part.

Preferably, the pico projector may be a pico projector or a laser scanning pico projector based on digital light processing. However, the invention is not limited thereto, and any pico projector can be applied to the invention, as long as the light projected by the pico projector meets the conditions described in the embodiments of the invention.

In the portable terminal device of the invention according to the embodiments of the invention, since the relative position between the pico projector and the display screen is fixed, when the laser scanning pico projector is adopted, it is possible to reduce the power constraint on the laser scanning pico projector. This is because it is necessary to limit the power of the laser scanning pico projector to prevent from damaging human's eyes during the application of traditional projector.

Usually, a traditional pico projector projects red (R), green (G), blue (B) light and uses a white display screen to reflect the light being projected on the display screen, and it is almost impossible to adopt a black or transparent display screen. It is already known that, in the traditional projector, black is essentially darker white, which is the reason why the display effect of the traditional projector in a bright environment is worse than in a dark environment. Thus, the traditional projector is not suitable for the bright environment. And it is also hard to be applied to a laptop, a PC and a TV display for daily use.

On the other hand, a projector of on-screen light generation type may projects light (for example, ultraviolet light or blue light near ultraviolet) onto a projection screen (which is the display screen) having fluorescent powder, which is hit by the ultraviolet light or blue light near ultraviolet being projected to emit colorful visual light to display. The projection technology of this kind can not only be applied to a dark environment but also to a bright environment. Besides, the projection technology of this kind can not only use a black display screen but also use a transparent display screen.

Figure 3:
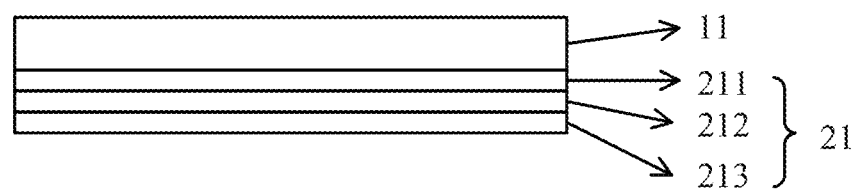
FIG. 3 shows an illustrative diagram of a display screen and a fluorescence film attached thereto of the portable terminal device according to the embodiments of the invention.

As shown in FIG. 3, it shows an illustrative diagram of a display screen 11 and a fluorescence film 21 attached thereto of the portable terminal device 1 according to the embodiments of the invention.

The portable terminal device 1 according to the embodiments of the invention may be a pico projector or a laser scanning pico projector based on digital light processing, and the image light projected by which is ultraviolet light or blue light near ultraviolet.

The display screen 11 is coated with a first fluorescent material for generating a first primary light visible to human eyes, a second fluorescent material for generating a second primary light visible to human eyes and a third fluorescent material for generating a third primary light visible to human eyes. Preferably, the first fluorescent material is coated on a first fluorescent film 211, the second fluorescent material is coated on a second fluorescent film 212, and the third fluorescent material is coated on a third fluorescent film 213. The first fluorescent film 211, the second fluorescent film 212 and the third fluorescent film 213 are attached to the display screen 11 successively. Alternatively, the first fluorescent material, the second fluorescent material and the third fluorescent material are coated on one layer of fluorescent film, wherein the fluorescent film is attached to the screen display 11. Also alternatively, the first fluorescent material, the second fluorescent material and the third fluorescent material are coated on the display screen 11 directly.

The first fluorescent material generates the first primary color by being hit by the ultraviolet light or the blue light near ultraviolet emitted from the pico projector, the second fluorescent material generates the second primary light by being hit by the ultraviolet light or the blue light near ultraviolet emitted from the pico projector, and the third fluorescent material generates the third primary light by being hit by the ultraviolet light or the blue light near ultraviolet emitted from the pico projector, and the first primary light, the second primary light and the third primary light are used to synthesize an image corresponding to the image signal of the predetermined format.

First Example

The image light projected by the pico projector 12 has a peak value of the intensity at a first wavelength and the intensities at other wavelengths are approximately zero. The first wavelength belongs to a waveband of ultraviolet light or blue light near ultraviolet. Preferably, the intensity of backlight decreases rapidly at the vicinity of the first wavelength, and is approximately zero at other wavelength.

Corresponding to the pixel arrangement of the pico projector 12, the display screen 12 is divided into pixel areas and each pixel area is further divided into three sub pixel areas, each of which is constituted of several sub blocks. For example, in each pixel area, it could be divided into 3n sub blocks (n is an integer greater than 1) like a chessboard. The (3i−2)-th (i is an integer greater than or equal to 1 and less than or equal to n) sub block constitutes a first sub pixel area, the (3i−1)-th (i is an integer greater than or equal to 1 and less than or equal to n) sub block constitutes a second sub pixel area, the 3i-th (i is an integer greater than or equal to 1 and less than or equal to n) sub block constitutes a third sub pixel area.

In the case of a first fluorescent film 211, a second fluorescent film 212, a third fluorescent film 213 being attached, in the first fluorescent film 211, the first fluorescent material is coated on a first sub pixel area of each pixel area; in the second fluorescent film 212, the second fluorescent material is coated on a second sub pixel area of each pixel area; in the third fluorescent film 211, the third fluorescent material is coated on a third sub pixel area of each pixel area.

In the case of one layer of fluorescent film being attached, the first fluorescent material is coated on a first sub pixel area of each pixel area on the fluorescent film, the second fluorescent material is coated on a second sub pixel area of each pixel area on the fluorescent film, and the third fluorescent material is coated on a third sub pixel area of each pixel area on the fluorescent film.

In the case of coating fluorescent material directly onto the display screen 11, the first fluorescent material is coated on a first sub pixel area of each pixel area, the second fluorescent material is coated on a second sub pixel area of each pixel area, and the third fluorescent material is coated on a third sub pixel area of each pixel area.

When the light of the first wavelength hits the first fluorescent material, the first fluorescent material generates the first primary color light; when the light of the second wavelength hits the second fluorescent material, the second fluorescent material generates the second primary color light; when the light of the third wavelength hits the third fluorescent material, the third fluorescent material generates the third primary color light. An image for viewers to watch is synthesized by the first primary color light, the second primary color light and the third primary color light. For example, the first primary color light is red light, the second primary color light is green light, and the third primary color light is blue light. Specifically, for each pixel area, the pixel light of the pixel area is synthesized by the first primary color light generated in the first sub pixel area, the second primary color light generated in the second sub pixel area and the third primary color light generated in the third sub pixel area.

The intensity of the image light projected by each pixel of the pico projector is adjusted/controlled according to the image data of the predetermined format, and an image corresponding to the image data of the predetermined format is generated.

Second Example

The image light projected by the pico projector 12 has a peak value of the intensity at a first wavelength, a second wavelength and a third wavelength, and the intensities at other wavelengths are approximately zero. The first wavelength, a second wavelength and a third wavelength belong to a waveband of ultraviolet light or blue light near ultraviolet. Preferably, the intensity of backlight decreases rapidly at the vicinity of the first wavelength, decreases rapidly at the vicinity of the second wavelength, decreases rapidly at the vicinity of the third wavelength, and is approximately zero at other wavelengths.

In the case of a first fluorescent film 211, a second fluorescent film 212, a third fluorescent film 213 being attached, the first fluorescent material is evenly coated on the first fluorescent film 211; the second fluorescent material is evenly coated on the second fluorescent film 212; the third fluorescent material is evenly coated on the third fluorescent film 213.

In the case of one layer of fluorescent film being attached, the first fluorescent material, the second fluorescent material and the third fluorescent material are evenly coated on the fluorescent film successively.

In the case of coating fluorescent material directly onto the display screen 11, the first fluorescent material, the second fluorescent material and the third fluorescent material are evenly coated on the display screen 11 successively.

When the light of the first wavelength hits the first fluorescent material, the first fluorescent material generates the first primary color light and the first fluorescent material is transparent for light of the second wavelength and the third wavelength; when the light of the second wavelength hits the second fluorescent material, the second fluorescent material generates the second primary color light and the second fluorescent material is transparent for light of the first wavelength and the third wavelength; and when the light of the third wavelength hits the third fluorescent material, the third fluorescent material generates the third primary color light and the third fluorescent material is transparent for light of the first wavelength and the second wavelength. An image for viewers to watch is synthesized by the first primary color light, the second primary color light and the third primary color light. For example, the first primary color light is red light, the second primary color light is green light, and the third primary color light is blue light. Specifically, for each pixel area, the pixel light of the pixel area is synthesized by the first primary color light generated by the first fluorescent material, the second primary color light generated by the second fluorescent material and the third primary color light generated by the third fluorescent material.

The intensities of respective wavelengths in the image light projected by each pixel of the pico projector are adjusted/controlled according to image data of the predetermined format, and an image corresponding to the image data of the predetermined format is generated.

The light of the first wavelength projected by the pico projector corresponds to the first primary color light in the image corresponding to the image signal of the predetermined format. The light of the second wavelength projected by the pico projector corresponds to the second primary color light in the image corresponding to the image signal of the predetermined format. The light of the third wavelength projected by the pico projector corresponds to the third primary color light in the image corresponding to the image signal of the predetermined format.

In conjunction with FIG. 1, the pico projector 12 projects ultraviolet light or blue light near ultraviolet onto the display screen 11, and the fluorescent material on the display screen 11 generates visual light by being stimulated by the ultraviolet light or the blue light near ultraviolet. The user views from the left side or the right side of the display screen 11.

Figure 4:
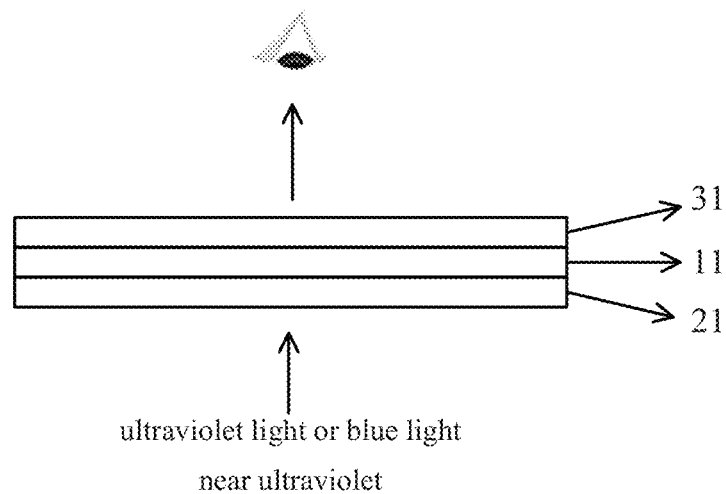
FIG. 4 shows an illustrative diagram of a display screen, a fluorescence film and an absorb film attached thereto of the portable terminal device according to the embodiments of the invention.

Furthermore, as shown in FIG. 4, it shows a display screen 11, and a fluorescence film 21 and a absorb film 31 attached thereto of the portable terminal device 1 according to the embodiments of the invention.

The fluorescence film 21 and the absorb film 31 are positioned on different sides of the display screen 11, respectively. Hereafter, of the display screen 11, the side attached with the fluorescence film 21 is referred as a first side, and the side attached with the absorb film 31 is referred as a second side.

The pico projector 12 projects the ultraviolet light or the blue light near ultraviolet onto the display screen 11. The fluorescent material on the display screen 11 generates the visual light by being stimulated by the ultraviolet light or the blue light near ultraviolet. The absorb film 31 absorbs all the ultraviolet light or the blue light near ultraviolet that has not been absorbed by the fluorescent material. And the user views the image from the back of the absorb film 31.

The portable terminal device according to embodiments of the invention, by fixing the positions of the projector and the display screen and by adopting a technology of on-screen light generation, may implement a display screen made of ultra-thin flat material, realize black display screen display and transparent display screen display and realize excellent display in both dark environment and bright environment.

The details of the invention have been described with details above. However, those skilled in the art should understand that various of modifications, combinations or sub combinations may be applied to these embodiments and fall within the scope of the invention, as long as without departing from the principle and spirit of the invention.

The invention claimed is:

1. A portable terminal device comprising:
   a display screen;
   a pico projector for receiving an image signal of a predetermined format and projecting an image light onto the display screen according to the image signal of the predetermined format, so that an image corresponding to the image signal of the predetermined format is displayed on the display screen; and
   a main body part, for fixing the display screen and the pico projector, the main body part comprising a first part, a second part and a hinge part, the display screen is fixed on the first part;
   wherein the pico projector is positioned at an edge of the display screen,
   wherein the first part and the second part is hinged by the hinge part, so that the first part is rotatable with respect to the second part, in order to form a predetermined angle between the pico projector and the display screen while projecting, wherein
   the image light projected by the pico projector is ultraviolet light or blue light near ultraviolet;
   on the display screen, a first fluorescent material for generating a first primary color light visible to human eyes, a second fluorescent material for generating a second primary color light visible to human eyes, and a third fluorescent material for generating a third primary color light visible to human eyes are coated; and
   the first fluorescent material is hit by the ultraviolet light or the blue light near ultraviolet projected from the pico projector to generate the first primary color light, the second fluorescent material is hit by the ultraviolet light or the blue light near ultraviolet projected from the pico projector to generate the second primary color light, and the third fluorescent material is hit by the ultraviolet light or the blue light near ultraviolet projected from the pico projector to generate the third primary color light, and the first primary color light, the second primary color light and the third primary color light are used to synthesize the image corresponding to the image signal of the predetermined format.

2. The portable terminal device of claim 1, wherein the main body part further comprises:
   a processor for generating the image signal of the predetermined format and transmitting the image signal of the predetermined format to the pico projector;
   a memory for storing various data that the portable terminal device needs; and
   an input part, for receiving an input operation of a user,
   wherein the processor, the memory and the input part are located in the second part.

3. The portable terminal device of claim 1, wherein the image signal of the predetermined format is generated and transmitted by another device.

4. The portable terminal device of claim 1, wherein
   the pico projector is movably fixed to an edge of the first part so that the pico projector is able to move along the edge of the first part;
   the pico projector is movably fixed to an edge where the second part and the first part are hinged so that the pico projector is able to move along the edge where the second part and the first part are hinged; or
   the pico projector is movably fixed to the hinge part, so that the pico projector is able to move along the hinge part.

5. The portable terminal device of claim 1, wherein
   the image light projected by the pico projector has a peak value of intensity at a first wavelength and intensities at other wavelengths are approximately zero, the first wavelength belongs to a waveband of the ultraviolet light or the blue light near ultraviolet,
   corresponding to the pixel arrangement of the pico projector, the display screen is divided into pixel areas and each pixel area is further divided into three sub pixel areas,
   the first fluorescent material is coated on a first sub pixel area of each pixel area, the second fluorescent material is coated on a second sub pixel area of each pixel area, and the third fluorescent material is coated on a third sub pixel area of each pixel area,
   wherein, when the light of the first wavelength hits the first fluorescent material, the first fluorescent material generates the first primary color light; when the light of the second wavelength hits the second fluorescent material, the second fluorescent material generates the second primary color light; and when the light of the third wavelength hits the third fluorescent material, the third fluorescent material generates the third primary color light.

6. The portable terminal device of claim 1, wherein
   the image light projected by the pico projector has peak values of intensity at a first wavelength, a second wavelength and a third wavelength, and the intensities at other wavelength are approximately zero, the first wavelength, the second wavelength and the third wavelength belong to a waveband of the ultraviolet light or the blue light near ultraviolet,
   the first fluorescent material, the second fluorescent material and the third fluorescent material are coated evenly on the display screen,
   wherein, when the light of the first wavelength hits the first fluorescent material, the first fluorescent material generates the first primary color light, and the first fluorescent material is transparent for light of the second wavelength and the third wavelength; when the light of the second wavelength hits the second fluorescent material, the second fluorescent material generates the second primary color light, and the second fluorescent material is transparent for light of the first wavelength and the third wavelength; and when the light of the third wavelength hits the third fluorescent material, the third fluorescent material generates the third primary color light, and the third fluorescent material is transparent for light of the first wavelength and the second wavelength.

7. The portable terminal device of claim 6, wherein
the light of the first wavelength projected by the pico projector corresponds to the first primary color light in the image corresponding to the image signal of the predetermined format,
the light of the second wavelength projected by the pico projector corresponds to the second primary color light in the image corresponding to the image signal of the predetermined format, and
the light of the third wavelength projected by the pico projector corresponds to the third primary color light in the image corresponding to the image signal of the predetermined format.

8. The portable terminal device of claim 1, wherein the pico projector is a pico projector or a laser scanning pico projector based on digital light processing.

9. The portable terminal device of claim 1, wherein
the pico projector is positioned at a first side of the display screen, and projects the image light from the first side of the display screen to the display screen;
an absorb film is arranged at a second side of the display screen, for absorbing the ultraviolet light or the blue light near ultraviolet that has not been absorbed by the first fluorescent material, the second fluorescent material and the third fluorescent material,
wherein the user views the image from the second side of the display screen.

10. The portable terminal device of claim 1, wherein the display screen is made of resin material, plastic material or fabric material.

* * * * *